(12) United States Patent
Dorfmann

(10) Patent No.: US 8,938,359 B1
(45) Date of Patent: Jan. 20, 2015

(54) HANDLE BAR ROUTE EXTENSION

(71) Applicant: The Boeing Company, Chicago, IL (US)

(72) Inventor: Cindy Dorfmann, Darmstadt (DE)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 13/932,338

(22) Filed: Jul. 1, 2013

(51) Int. Cl.
*G08G 1/123* (2006.01)
*G01C 21/00* (2006.01)
*A63F 3/00* (2006.01)
*G01C 23/00* (2006.01)
*G06Q 10/02* (2012.01)

(52) U.S. Cl.
CPC ............. *G01C 21/00* (2013.01); *A63F 3/00088* (2013.01); *G01C 23/00* (2013.01); *A63F 3/00006* (2013.01); *G06Q 10/02* (2013.01); *G01C 23/005* (2013.01)
USPC ........... 701/533; 701/120; 701/300; 701/301; 701/412; 701/418; 340/945; 340/961; 340/963; 340/971; 340/973; 342/29; 342/65; 342/451; 702/3; 348/117

(58) Field of Classification Search
CPC .. G01C 23/005; G01C 23/00; A63F 3/00006; A63F 3/00088; G06Q 10/02
USPC ............... 701/1, 3, 4, 14, 120, 300, 301, 408, 701/412, 418, 454, 455, 467, 468, 528, 701/533; 340/945, 961, 963, 971, 973, 988, 340/990, 995.14, 995.16, 995.18, 995.26; 342/29, 65, 451; 702/3; 348/117; 706/906; 244/3.1
See application file for complete search history.

(56) References Cited

U.S. PATENT DOCUMENTS

| 3,453,624 | A  |   | 7/1969  | Rockey |        |
|-----------|----|---|---------|--------|--------|
| 4,081,783 | A  |   | 3/1978  | Honda  |        |
| 5,978,715 | A  | * | 11/1999 | Briffe et al. | 701/11 |
| 6,038,498 | A  | * | 3/2000  | Briffe et al. | 701/3  |
| 6,112,141 | A  | * | 8/2000  | Briffe et al. | 701/14 |
| 7,256,710 | B2 | * | 8/2007  | Mumaw et al. | 340/973 |
| 8,380,366 | B1 | * | 2/2013  | Schulte et al. | 701/3 |

FOREIGN PATENT DOCUMENTS

EP    2 362 183    8/2011

OTHER PUBLICATIONS

International Search Report and Written Opinion dated Jul. 16, 2014 from International Application No. PCT/US2014/032583.

\* cited by examiner

*Primary Examiner* — McDieunel Marc
(74) *Attorney, Agent, or Firm* — Hope Baldauff LLC

(57) ABSTRACT

A handle bar route extension mechanism for creating or modifying a flight route. The handle bar route extension mechanism can allow a user to create or modify a flight route using a destination point. The handle bar route extension mechanism can be automatically rendered in a display in response to a touch input. In some configurations, the handle bar route extension mechanism may be rendered in a display in various directions or various lengths based on different inputs. In further configurations, more than one handle bar route extension mechanism may be rendered in a display.

20 Claims, 9 Drawing Sheets

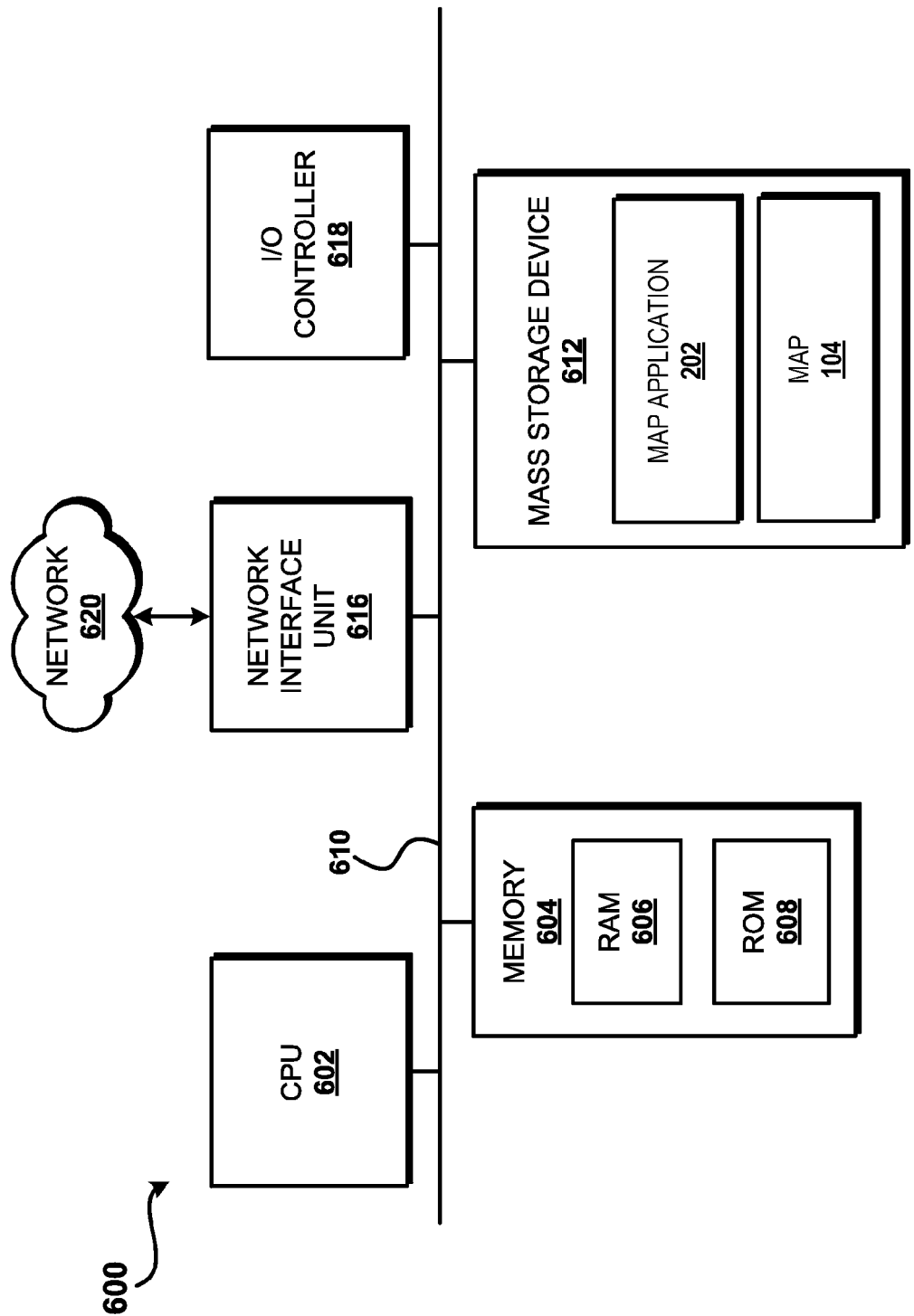

HANDLE BAR ROUTE EXTENSION

BACKGROUND

Conventional mapping technologies for flight operations can include interactive touchscreen devices. Touchscreen devices can allow pilots to perform various functions before and during a flight. For example, a map application may be presented in a display of the touchscreen device. The map application can display, among other data, the current flight path, the current location of the aircraft, flight details of the aircraft, and a direction in which the aircraft is heading. Some map applications allow the pilot to change information in the map while in use. For example, the map application may allow the pilot to zoom into or zoom out of a map.

In another example, the map application may allow the pilot to interact with a flight route displayed in the map application. When receiving an input in conventional map applications to change the flight route, a typical manner in which the flight route is modified is through "rubberbanding." In a conventional map application, when a user touches a departure point, a destination point, or an intermediate point, the user may be able to move the point to another location.

FIGS. 1A and 1B show an exemplary implementation of rubberbanding in conventional map applications. In FIG. 1A, a touchscreen device 100 is executing a map application 102 in a display 101. The map application 102 causes a map 104 to be rendered in the map application 102. The map 104 includes a departure point 106 and a destination point 108. The flight route between the departure point 106 and the destination point 108 is indicated by flight route line 110.

A user 112 can "drag," or rubberband, a point on the flight route to create an intermediate point 114 by touching a touch point 116 and dragging the touch point 116 to touch point 118. A preliminary flight route line 120 can be rendered to provide a visual indication to the user 112 of the movement of the flight route line 110. FIG. 1B shows the map 104 when the user 112 removes the touch input. The flight route line 110 has been removed, while the preliminary flight route line 120 is rendered in a solid line to indicate that the flight route line 120 represents the current flight route.

When using conventional rubberbanding technologies, a user may need to have at least two points designated on a map in order to create the flight route line that allows a user to interact with the flight route line. Also, in conventional technologies, once the user removes the touch input, such as removing their finger from the touch display device, the original route may be removed and replaced by the rubberbanded route, as described in FIG. 1B. It may be difficult, or impossible, for a user to switch back to the rubberbanded route or remove any intermediate points input by the rubberbanding technology.

It is with respect to these and other considerations that the disclosure made herein is presented.

SUMMARY

It should be appreciated that this Summary is provided to introduce a selection of concepts in a simplified form that are further described below in the Detailed Description. This Summary is not intended to be used to limit the scope of the claimed subject matter.

According to one aspect, a computer-implemented method for building a flight route line is provided. The method may include rendering a map, rendering an initial location, rendering a handle bar route extension mechanism at the initial location, receiving an input to adjust the handle bar route extension mechanism to create an additional location, rendering the additional location, and building the flight route line in response to the input to adjust the handle bar route extension mechanism.

According to another aspect of the disclosure herein, a device for building a flight route line is provided. The device may include a map application that is configured to render a map, render an initial location, render a handle bar route extension mechanism, render an additional location, and build a flight route line in response to a touch input to adjust the handle bar route extension mechanism. The device may also include a touchscreen configured to detect the touch input to adjust the handle bar route extension mechanism.

According to yet another aspect, a computer is provided. The computer may include a central processing unit and a computer-readable storage medium in communication with the processor. The computer-readable storage medium may include computer-executable instructions stored thereupon which, when executed by the central processing unit, cause the processor to render a map, render an initial location, render a handle bar route extension mechanism at the initial location, receive an input to adjust the handle bar route extension mechanism, render an additional location, and build a flight route line in response to the input to adjust the handle bar route extension mechanism.

The features, functions, and advantages discussed herein can be achieved independently in various embodiments of the present disclosure as taught herein, combinations thereof, or may be combined in yet other embodiments, further details of which can be seen with reference to the following description and drawings.

BRIEF DESCRIPTION OF THE DRAWINGS

FIG. 6 is a computer architecture diagram showing an illustrative computer hardware and software architecture for a computing system capable of implementing aspects of the embodiments presented herein.

DETAILED DESCRIPTION

Figure 1A:
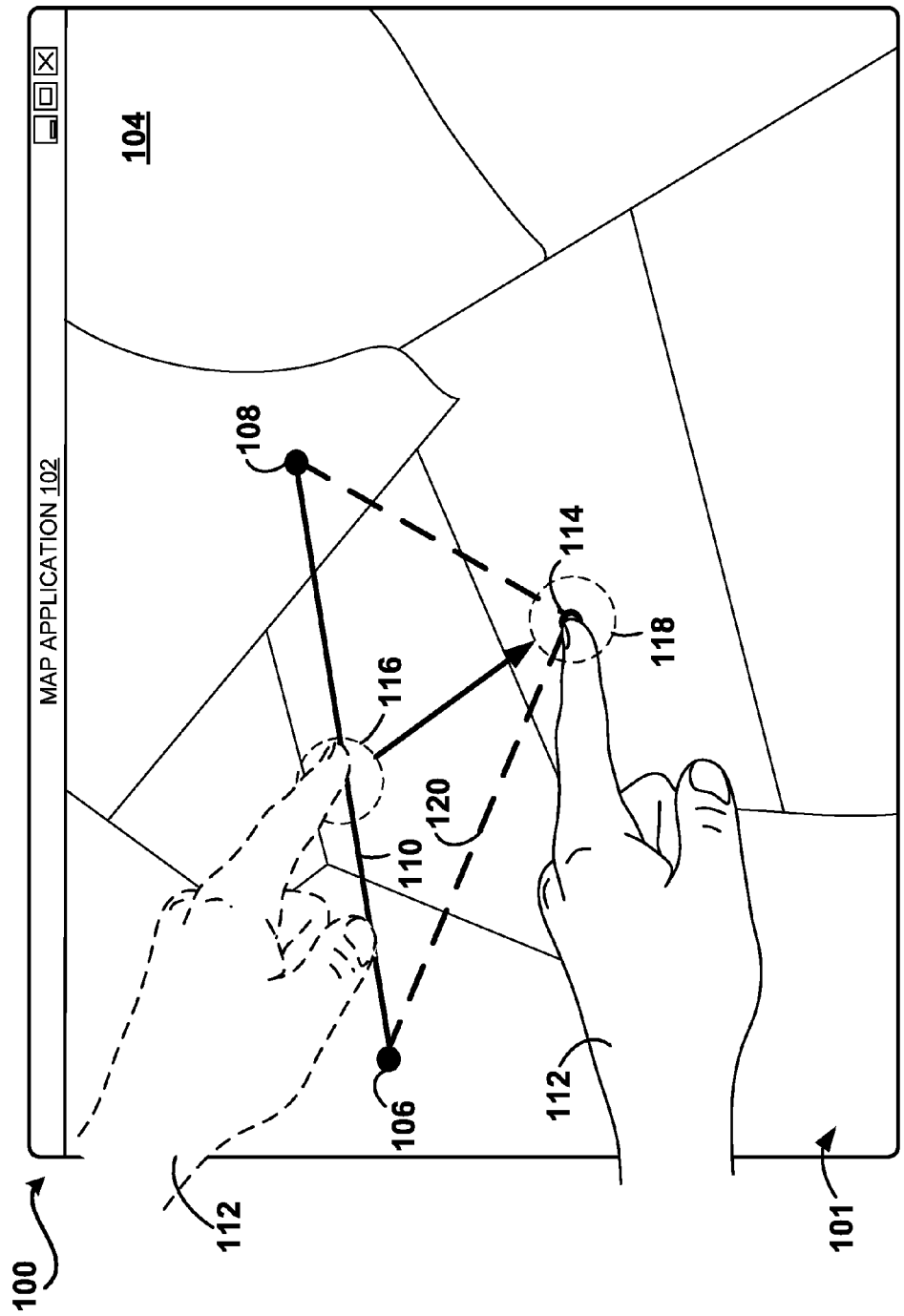
FIGS. 1A and 1B illustrate a screen diagram of a touchscreen device implementing a conventional map application using rubberbanding to modify flight routes.

The following detailed description is directed to a handle bar route extension mechanism ("handle bar"). In some configurations, the handle bar may provide a user with the ability to modify or create a flight route. In some configurations, a handle bar may be displayed upon the placement of a location on a map. In some configurations, a handle bar may be rendered as a line extending from an initial location to a preliminary location. A user can interact with the handle bar to create a second point on the map by moving the preliminary location to a desired location. In some implementations, this interaction may help create a flight route line from the initial location to the desired location, which may be used by the pilot when navigating an aircraft. In some configurations, the handle bar can provide interactive flight route creation or modification without the need to have a second point prior to the use of the handle bar.

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

In the following detailed description, references are made to the accompanying drawings that form a part hereof, and in which are shown by way of illustration specific embodiments or examples. Referring now to the drawings, in which like numerals represent like elements throughout the several figures, aspects of a computing system, computer-readable storage medium, and computer-implemented methodologies for implementing a handle bar route extension mechanism and other aspects will be presented.

Figure 2A:
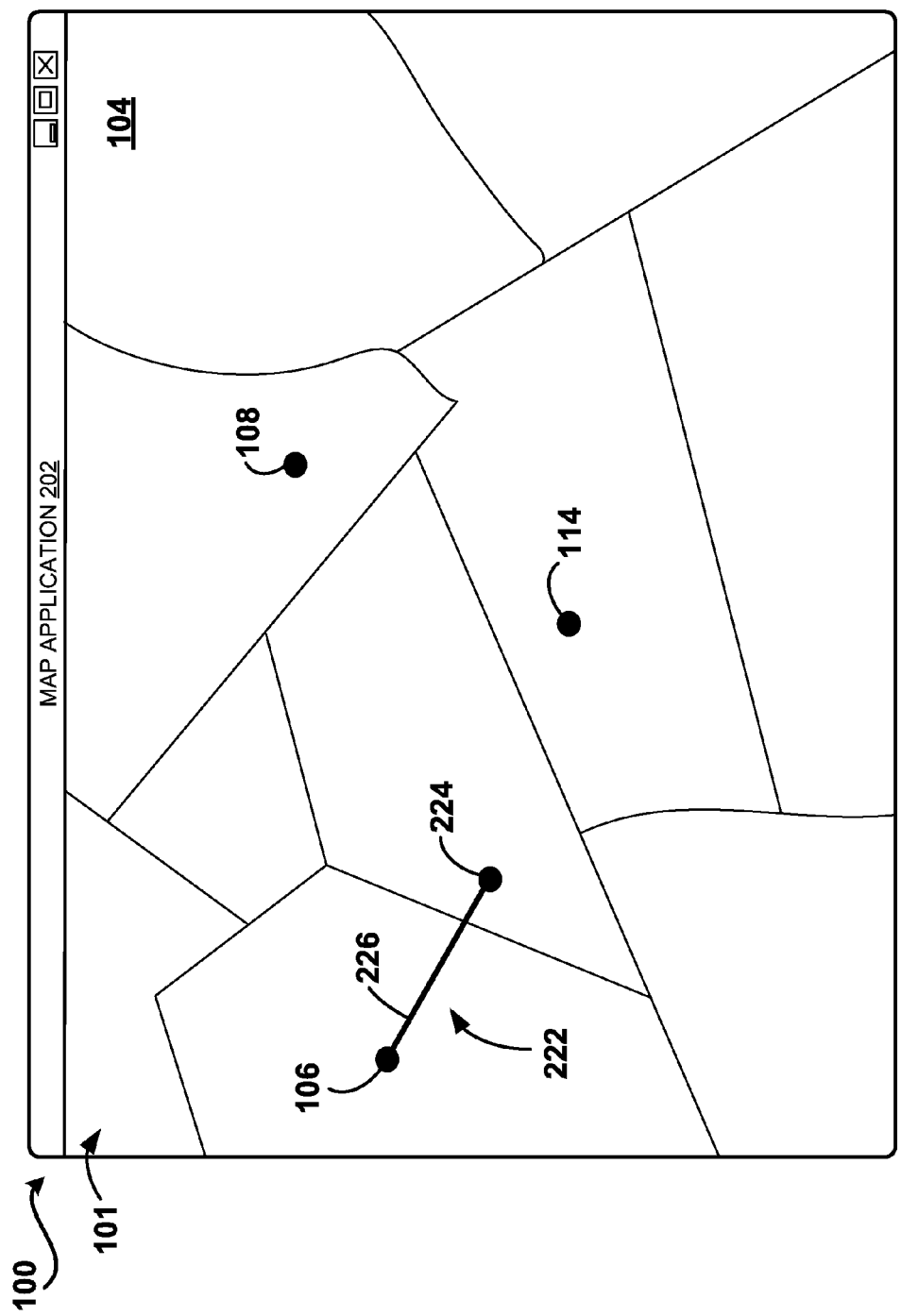
FIGS. 2A and 2B illustrate a screen diagram of a touchscreen device implementing a map application using a handle bar route extension, according to various embodiments.
Figure 2B:
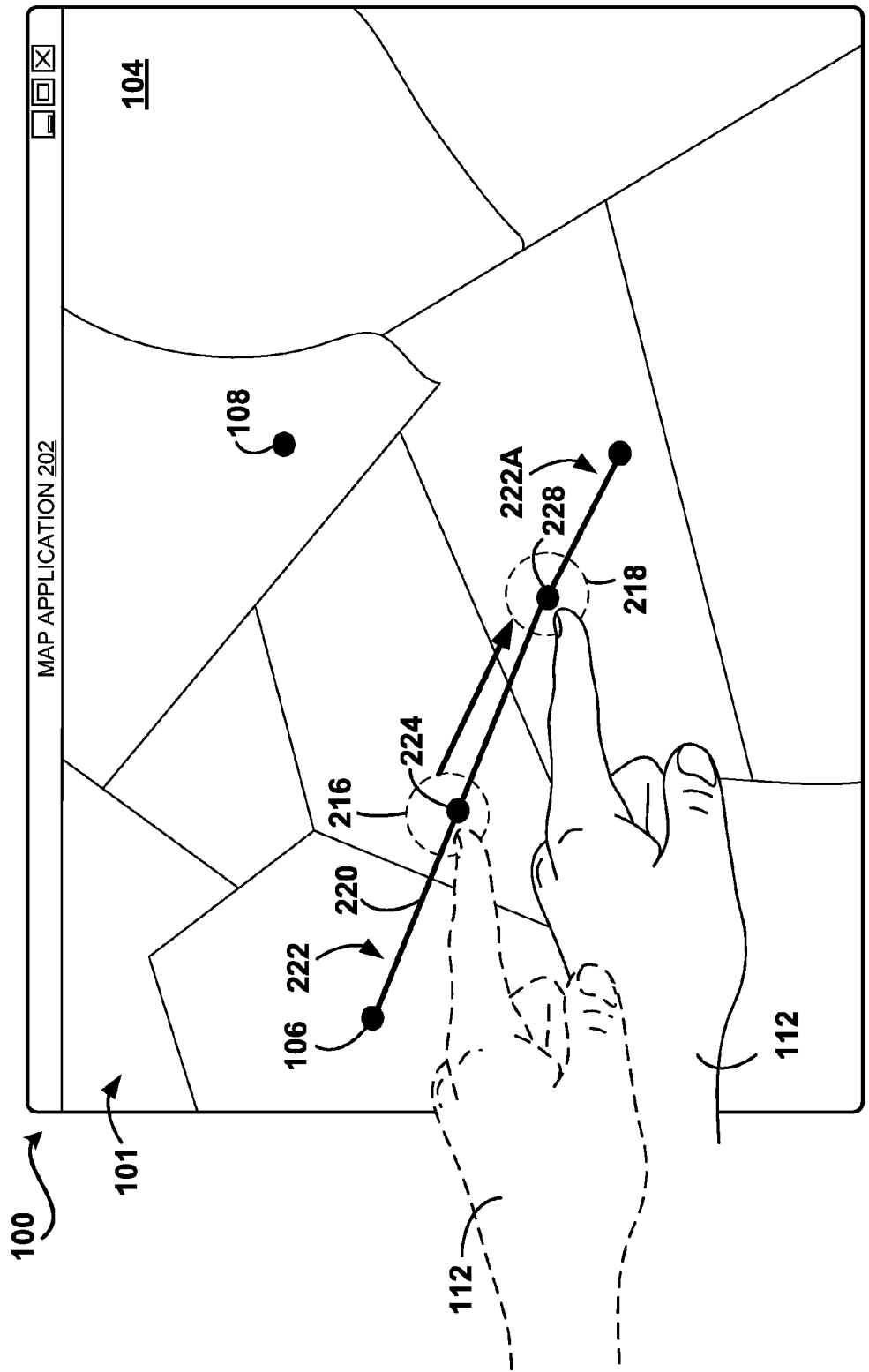

FIGS. 2A and 2B illustrate the touchscreen device 100 implementing a map application 202 rendering a handle bar 222. The touchscreen device 100 is executing the map application 202. The map application 202 causes the map 104 to be rendered in the display 101 of the touchscreen device 100. The touchscreen device 100 can be an input device configured to detect the presence and location of a touch. The touchscreen device 100 may be a resistive touchscreen, a capacitive touchscreen, a perceptive pixel touchscreen, a surface acoustic wave touchscreen, an infrared touchscreen, an optical imaging touchscreen, a dispersive signal touchscreen, an acoustic pulse recognition touchscreen, or may utilize any other touchscreen technology.

In some embodiments, the touchscreen device 100 is a single-touch touchscreen. In other embodiments, the touchscreen device 100 is a multi-touch touchscreen. In some embodiments, the touchscreen device 100 is configured to detect discrete touches, single touch gestures, and/or multi-touch gestures. These are collectively referred to herein as gestures for convenience. Several gestures will now be described. It should be understood that these gestures are illustrative and are not intended to limit the scope of the appended claims. Moreover, the described gestures, additional gestures, and/or alternative gestures may be implemented in software for use with the touchscreen device 100. As such, a developer may create gestures that are specific to a particular application program.

In some embodiments, the touchscreen device 100 supports a tap gesture in which a user taps the touchscreen device 100 once on an item presented in the display 101. The tap gesture may be used for various reasons including, but not limited to, opening or launching whatever the user taps. In some embodiments, the touchscreen device 100 supports a double tap gesture in which a user taps the touchscreen device 100 twice on an item presented in the display 101. The double tap gesture may be used for various reasons including, but not limited to, zooming in or zooming out in stages. In some embodiments, the touchscreen device 100 supports a tap and hold gesture in which a user taps the touchscreen device 100 and maintains contact for at least a pre-defined time. The tap and hold gesture may be used for various reasons including, but not limited to, opening a context-specific menu.

In some embodiments, the touchscreen device 100 supports a drag gesture in which a user places a finger on the touchscreen device 100 and maintains contact with the touchscreen device 100 while moving the finger on the touchscreen device 100. The drag gesture may be used for various reasons including, but not limited to, manipulating items rendered in a display or moving through screens, images, or menus at a controlled rate. Multiple finger drag gestures are also contemplated. In some embodiments, the touchscreen device 100 supports a flick gesture in which a user swipes a finger in the direction the user wants the screen to move. The flick gesture may be used for various reasons including, but not limited to, scrolling horizontally or vertically through menus or pages. In some embodiments, the touchscreen device 100 supports a pinch and stretch gesture in which a user makes a pinching motion with two fingers (e.g., thumb and forefinger) on the touchscreen device 100 or moves the two fingers apart. The pinch and stretch gesture may be used for various reasons including, but not limited to, zooming gradually in or out of a website, visualization, data set, data representation, map, picture, combinations thereof, or the like.

Although the above gestures have been described with reference to the use of one or more fingers for performing the gestures, other appendages such as toes or objects such as styluses may be used to interact with the touchscreen device 100. As such, the above gestures should be understood as being illustrative and should not be construed as being limiting in any way.

Further, although the present disclosure is described in terms of a touchscreen device, it should be understood that various implementations of the present disclosure may be used in conjunction with other forms of input, such as a mouse, a keyboard, and the like. The use of the touchscreen device 100 in the following description is for purposes of illustration and not to limit the scope of the present disclosure to only touchscreen devices.

Figure 1B:
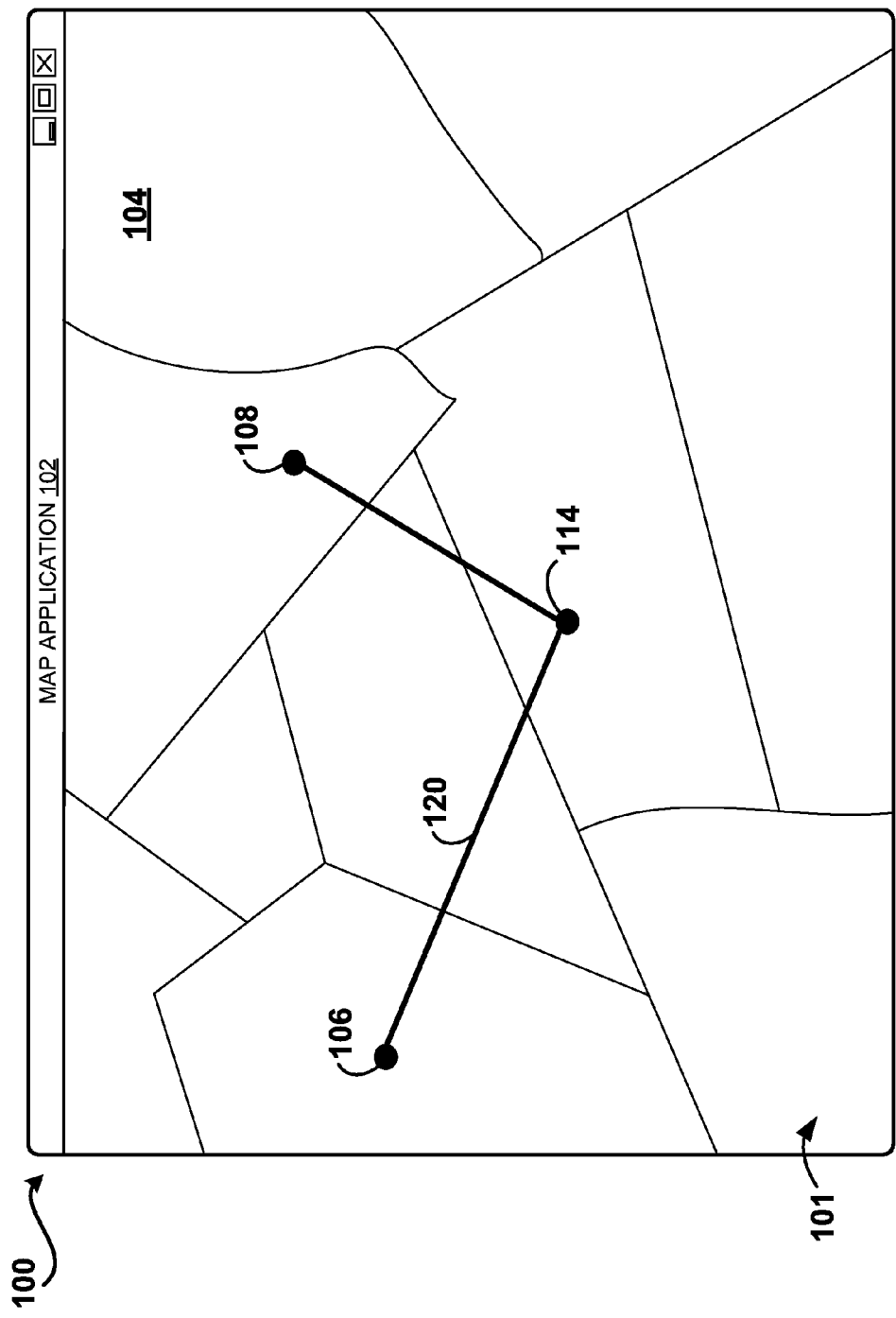

Returning to FIG. 2A, the departure point 106 has been specified and rendered in the map 104 in the display 101. The destination point 108 from FIGS. 1A and 1B, as well as location 114, may also be rendered in the map 104 to provide information to the user 112. It should be understood, however, that the present disclosure does not require the rendering of any additional location, as some implementations of the present disclosure provide the user 112 with the ability to create a flight route without the use of additional locations. In some configurations, the departure point 106 may be specified by a user, such as the user 112, using a keyboard or other form of input. In some embodiments, the departure point 106 may also be specified by another entity, such as a central system, configured to provide a user with various data, including the departure point 106. These and other configurations are considered to be within the scope of the present subject matter.

Once a point, such as the departure point 106, is specified, a handle bar 222 may be rendered in the map 104. One distal end of the handle bar 222 may be the departure point 106 and the other distal end may be a waypoint 224. It should be understood that, as used herein, "waypoint" and "destination" may be used interchangeably. A handle bar line 226 may be rendered between the departure point 106 and the waypoint 224. In one configuration, the handle bar 222 may be rendered automatically when the departure point 106, or other point in the map 104, is specified. In another configuration, the handle bar 222 may be rendered upon an input directed to cause the rendering the of the handle bar 222. In a still further configuration, the handle bar 222 may be rendered based on a predetermined input, such as the specification of a certain point. These and other configurations are considered to be within the scope of the present disclosure.

FIG. 2B shows how the user 112 may interact with the handle bar 222 to create a flight route line. In FIG. 2B, the user 112 touches the touchscreen device 100 at touch point 216, which is proximate the waypoint 224. The user 112 can drag the user's finger from the touch point 216 to a touch point 218. The user 112 may then remove the touch input by removing the finger of the user 112 from the touch device 100. The removal of the touch input may cause the rendering of a second waypoint 228 in the map along with a flight route line 220. In some configurations, an additional handle bar 222A may be rendered upon the rendering of the second waypoint 228. This may allow the user 112 to continue building a flight route line.

The handle bar 222 and/or the handle bar 222A may be rendered in the map 104 in various ways. In one implementation, the direction on the map 104 in which the handle bar 222 and/or the handle bar 222A is rendered may be rendered corresponding to a direction criteria. For example, the handle bar 222 and/or the handle bar 222A may be rendered in a direction similar to the flight route line 220. In another example, the handle bar 222 and/or the handle bar 222A may be rendered in a direction towards a possible destination, such as destination point 108. In a still further example, the direction of the handle bar 222 and/or the handle bar 222A may be based on previously used flight route lines on the map 104 from prior flights.

In another implementation, the handle bar 222 and/or the handle bar 222A may be rendered in a direction based on current flight conditions. For example, the handle bar 222 and/or the handle bar 222A may be rendered in a direction away from a dangerous condition, such as a storm cloud or other inclement weather. In another example, the handle bar 222 and/or the handle bar 222A may be rendered in a direction based on the available fuel in the aircraft, providing a suggested flight path towards a suggested location. In another example, the handle bar 222 and/or the handle bar 222A may be rendered in a direction based on the current direction of the aircraft. It should be understood, however, that other factors may be used to determine a direction for the handle bar 222 and/or the handle bar 222A. The presently disclosed subject matter is not limited to any particular manner in which direction is determined.

In some implementations, the initial length of the handle bar line 226 may be different based on various inputs. In one implementation, the length of the handle bar line 226 may reflect a speed of the aircraft. For example, a relatively longer length of the handle bar line 226 may be useful when an aircraft is traveling at a high rate of speed in relation the scale of the map 104. Because of the distance traveled by the aircraft at a relatively high rate of speed, having a longer length for the handle bar line 226 may better reflect the flight conditions and provide the user 112 with a better sense of travel.

The length of the handle bar line 226 may vary depending on destination points available in a particular area. For example, if the aircraft is in a location with a significant number of potential destination points, the length of the handle bar line 226 may be relatively short to allow, among other possible benefits, ease of movement of the handle bar line 226 within the dense region of destination points. It should be understood, however, that other factors may be used to determine an initial length for the handle bar line 226. The presently disclosed subject matter is not limited to any particular manner in which the initial length is determined.

Figure 3A:
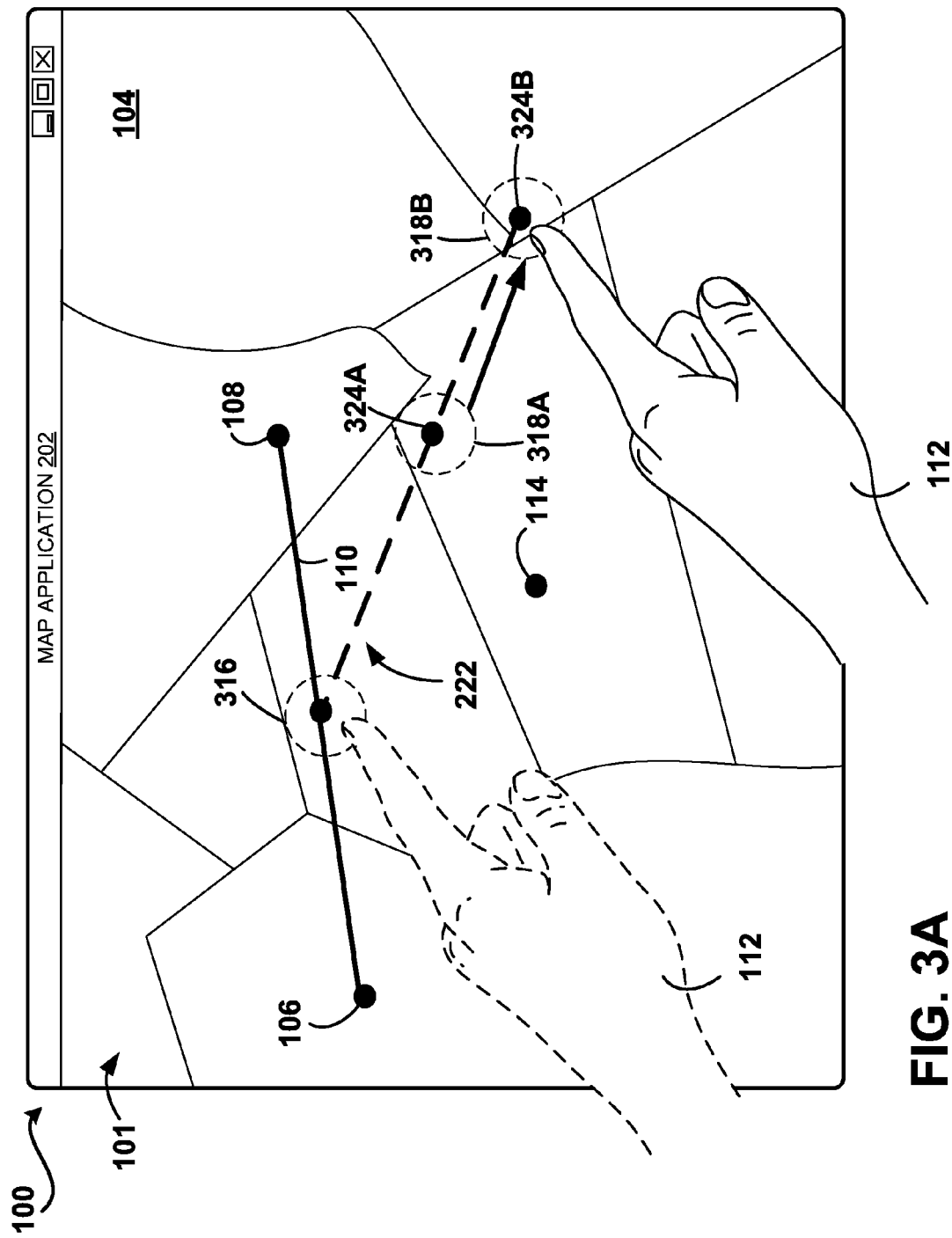
FIGS. 3A and 3B illustrate a screen diagram of a touchscreen device in which a handle bar route extension is used at an intermediate location between a departure point and a destination point, according to various embodiments.

FIG. 3A illustrates the touchscreen device 100 when the handle bar 222 is used at an intermediate location between the departure point 106 and the destination point 108. It should be understood that, as used herein, "intermediate" includes a location between two locations and is not limited to a location halfway between two locations. In the display 101, the map 104 has rendered thereon the departure point 106 and the destination point 108. The flight route line 110 indicates a flight route between the departure point 106 and the destination point 108. In the configuration illustrated in FIG. 3A, the user 112 may touch the touchscreen device 100 at touch point 316, which is a location at some distance between the departure point 106 and the destination point 108.

As a result of the touch at the touch point 316, the handle bar 222 may be rendered. In some configurations, because the handle bar 222 is invoked in an intermediate point, the handle bar 222 may be rendered as a dashed line or in some other manner to differentiate the handle bar 222 from the flight route line 110. The handle bar 222 may have a preliminary point 324A, which is a default distance and direction from the touch point 316. The user 112 may touch the touchscreen device 100 at touch point 318A, which is proximate to the preliminary point 324A, to move the preliminary point 324A. The user 112 may drag the user's finger from touch point 318A to touch point 318B. Upon removal of the touch input, the preliminary point 324B may be changed from a preliminary point 324B to a destination point 108A, as shown by way of example, in FIG. 3B.

Figure 3B:
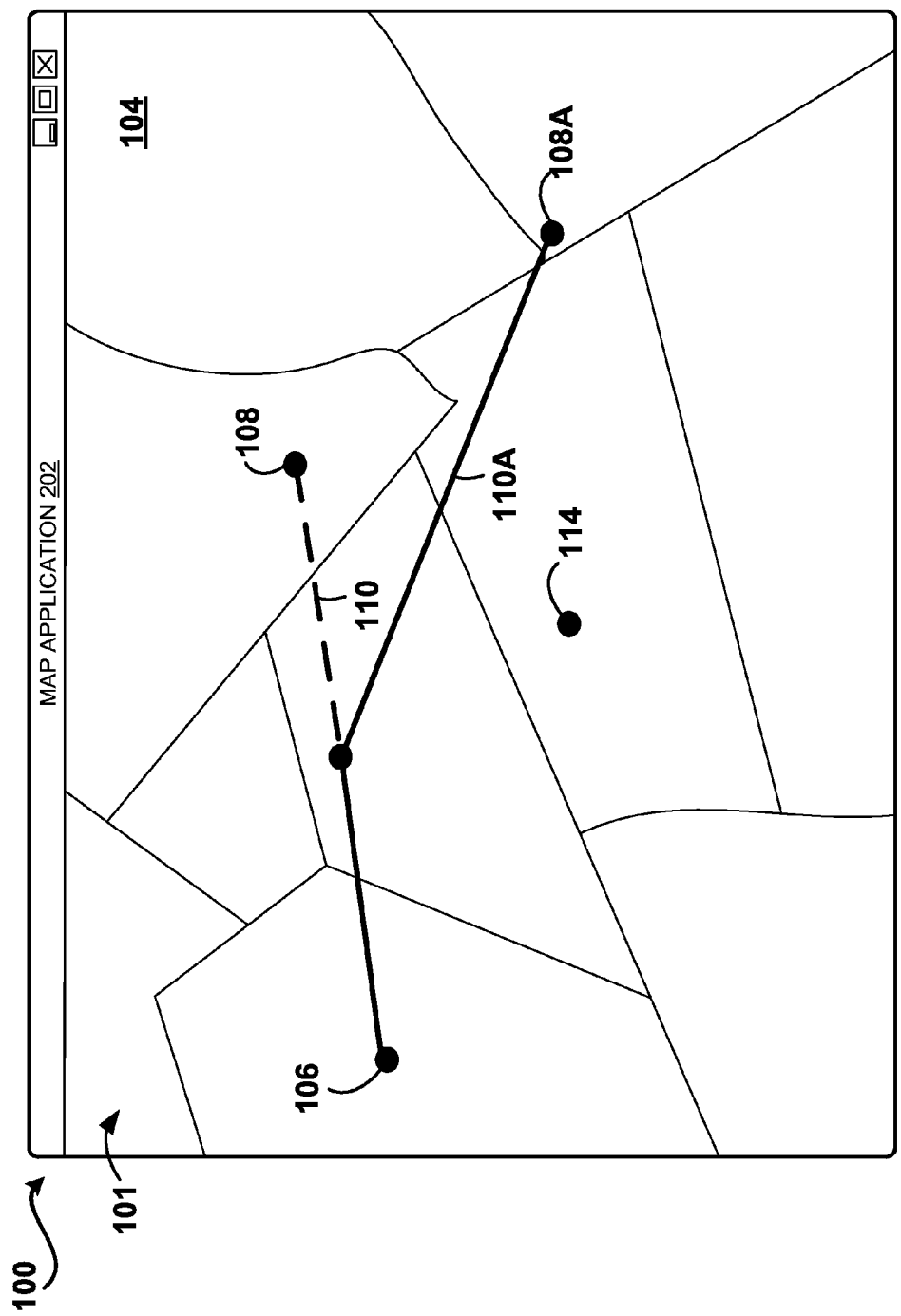

In FIG. 3B, the handle bar 222 has been removed from the map 104 in the display 101, replaced by the flight route line 110A. The flight route line 110A extends from the location at the touch point 316 to the destination point 108A. In some configurations, to provide the user 112 with an indication of prior flight paths, the changed flight path, such as the flight route line 110, may be rendered in a manner that differentiates the modified flight route line from the current flight route line. In FIG. 3B, the flight route line 110 has been rendered as a dashed line from the location at the touch point 316 to the destination point 108.

Figure 4:
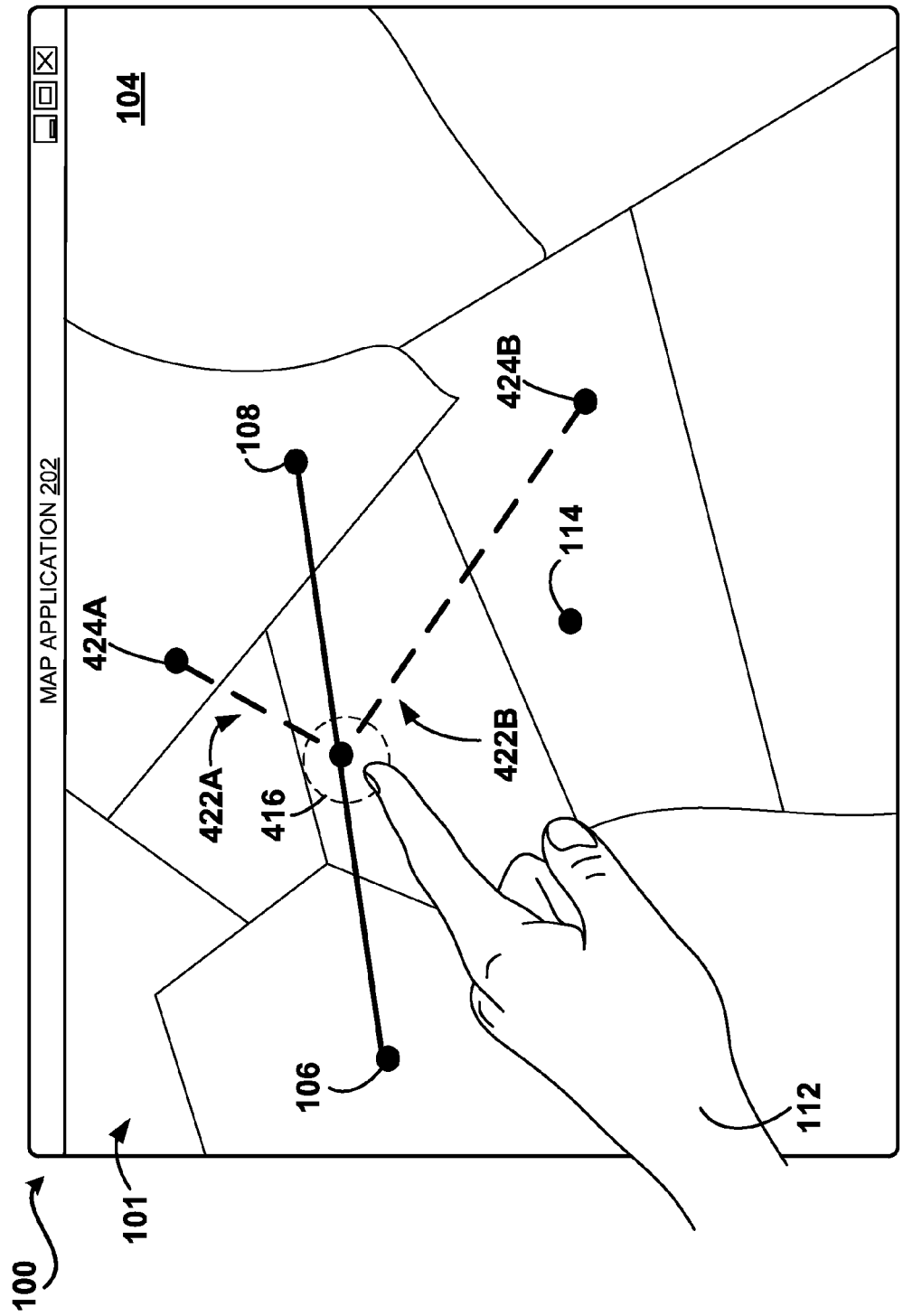
FIG. 4 illustrates a screen diagram of a touchscreen device in which more than one handle bar route extensions are displayed in response to a touch input, according to various embodiments.

In some implementations, more than one handle bar may be displayed in the display 101. FIG. 4 illustrates the touchscreen device 100 in which more than one handle bar is displayed in response to a touch input. In FIG. 4, the flight route line 110 from the departure point 106 to the destination point 108 is rendered in the map 104. In the implementations discussed above, when the user 112 touches a location on the map 104, a handle bar is shown as being rendered in the map 104 in response to the touch input. The present disclosure, however, is not limited to any specific number of handle bars rendered.

For example, when the user 112 touches the touch point 416, two handle bars are rendered, handle bar 422A and 422B. Along with the handle bars, a preliminary point 424A is provided at the distal end of the handle bar 422A and a preliminary point 424B is provided at the distal end of the handle bar 422B. The handle bars 422A and 422B may be rendered in a manner that provides the user 112 with possible, alternate routes extending from the location at the touch point 416. In a manner similar to that described in configurations above, the user 112 may move the handle bars 422A and/or 422B to build a route.

Figure 5:
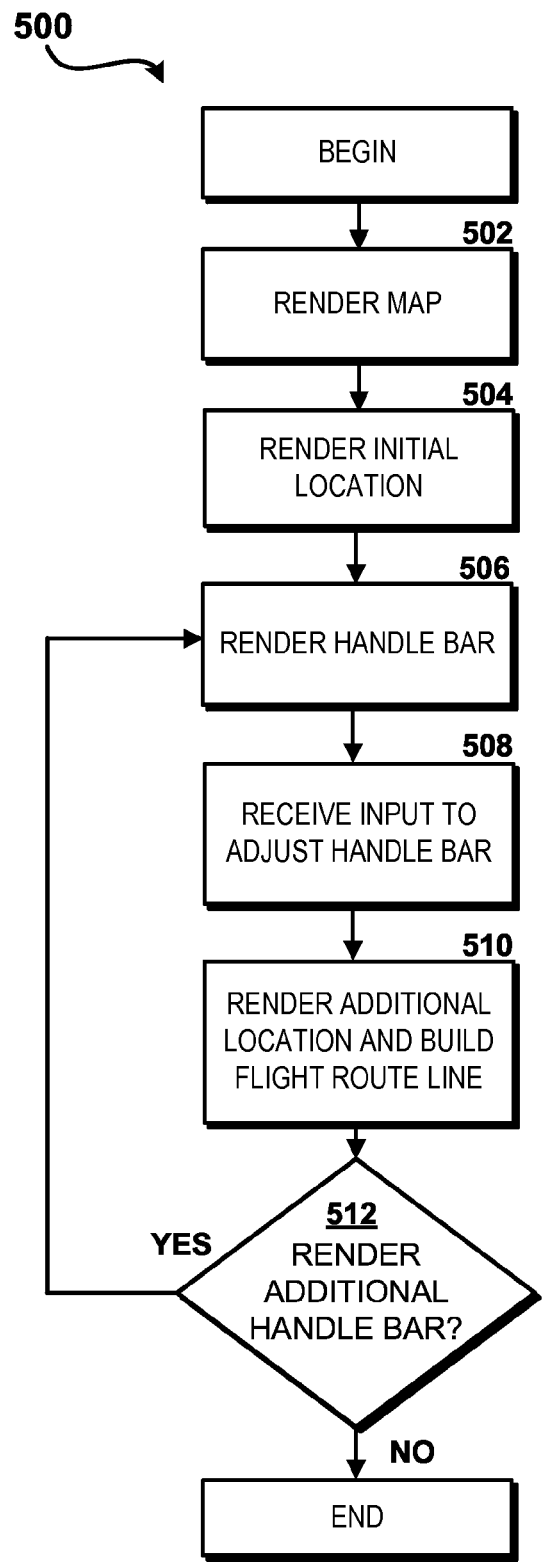
FIG. 5 is an exemplary routine for implementing a handle bar route extension, according to various embodiments.

Turning now to FIG. 5, an illustrative routine 500 for using a handle bar route extension mechanism is provided herein.

Unless otherwise indicated, it should be appreciated that more or fewer operations may be performed than shown in the figures and described herein. Additionally, unless otherwise indicated, these operations may also be performed in a different order than those described herein.

The routine 500 starts at operation 502, where the map 104 is rendered by the map application 202. The type of information displayed on the map 104 may vary depending on the type of map application 202. For example, the map application 202 may be a flight route map application. In that example, the map 104 may have information relating to flight information regions and/or upper flight information regions. The map 104 may also have information relating to geographical features of the area. For example, the map 104 may have cities, counties and states rendered in the map 104. The present disclosure, however, is not limited to any particular type of map or particular map application.

The routine 500 proceeds to operation 504, where an initial location is rendered. The initial location can be a location such as the departure point 106 or a point along a flight path, such as the location associated with the touch point 316. Various configurations of the presently disclosed subject matter may provide for the creation or modification of a route using only one location, such as the initial location. The initial location may also be a location provided by a source other than the user 112. For example, the map application 202 may receive an input that the current flight path should be changed. In that example, the initial location may automatically appear without an input from the user 112.

The routine 500 proceeds to operation 506, where the handle bar 222 is rendered. As described above, the handle bar 222 may be rendered visually in various ways. For example, the handle bar 222 may be rendered in a direction similar to the flight route line 220. In another example, the handle bar 222 may be rendered in a direction towards a possible destination, such as destination point 108. In a still further example, the direction of the handle bar 222 may be based on previously used flight route lines on the map 104 from prior flights. In another implementation, the handle bar 222 may be rendered in a direction based on current flight conditions. In another example, the handle bar 222 may be rendered in a direction based on the available fuel in the aircraft, providing a suggested flight path towards a suggested location. In another example, the handle bar 222 may be rendered in a direction based on the current direction of the aircraft.

The routine 500 proceeds to operation 508, where an input is received to adjust the handle bar 222. The input may vary depending on the particular configuration of the device rendering the map 104. In the examples provided above in regard to FIGS. 2A and 2B, the input can be a touch input provided by the user 112 when physically interacting with a touch location on the touchscreen device 100. Other examples include, but are not limited to, a keyboard input, a mouse input, an input from another system, and the like.

The routine 500 proceeds to operation 510, where an additional location is rendered and a flight route is built based on the touch input. In the example provided in FIGS. 3A and 3B, the user 112 provides an input to cause the rendering of the destination point 108A. As illustrated in FIG. 3A, the user 112 may touch the touchscreen device 100 at touch point 318A, which is proximate to the preliminary point 324A, to move the preliminary point 324A. The user 112 may drag the user's finger from touch point 318A to touch point 318B. Upon removal of the touch input, the preliminary point 324B may be changed from a preliminary point 324B to a destination point 108A.

The routine 500 proceeds to operation 512, where a determination is made as to whether or not an additional handle bar is to be rendered after the rendering of the destination point 108A. In some configurations, the handle bar 222A may be rendered upon the rendering of the destination point 108A. In that configuration, the rendering of the handle bar 222A automatically may provide the user 112 with an easier or more intuitive interface for building or modifying a flight route line.

In response to a determination at operation 512 that an additional handle bar is not rendered, the routine 500 proceeds to end. In response to a determination at operation 512 that an additional handle bar is to be rendered, the routine 500 proceeds to operation 506, where a handle bar is rendered. The routine 500 proceeds in the manner indicated above.

FIG. 6 is an illustrative computer architecture 600 for a device capable of executing the software components described above. Thus, the computer architecture 600 illustrated in FIG. 6 illustrates an architecture for a server computer, mobile phone, a PDA, a smart telephone, a desktop computer, a netbook computer, a tablet computer, and/or a laptop computer. The computer architecture 600 may be utilized to execute any aspects of the software components presented herein. For example, the computer architecture 600 may be used to implement the map 104 or the map application 202.

The computer architecture 600 illustrated in FIG. 6 includes a central processing unit ("CPU") 602, a system memory 604, including a random access memory 606 ("RAM") and a read-only memory ("ROM") 608, and a system bus 610 that couples the memory 604 to the CPU 602. A basic input/output system containing the basic routines that help to transfer information between elements within the computer architecture 600, such as during startup, is stored in the ROM 608. The computer architecture 600 further includes a mass storage device 612 for providing the map 104 or the map application 202.

The mass storage device 612 is connected to the CPU 602 through a mass storage controller (not shown) connected to the bus 610. The mass storage device 612 and its associated computer-readable media provide non-volatile storage for the computer architecture 600. Although the description of computer-readable media contained herein refers to a mass storage device, such as a hard disk or CD-ROM drive, it should be appreciated by those skilled in the art that computer-readable media can be any available computer storage media or communication media that can be accessed by the computer architecture 600.

Communication media includes computer readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

By way of example, and not limitation, computer storage media may include volatile and non-volatile, removable and non-removable media implemented in any method or technology for storage of information such as computer-readable instructions, data structures, program modules or other data. For example, computer media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium that can be used to store the desired information and which can be accessed by the computer architecture 600. For purposes of the claims, the phrase "computer storage medium," and variations thereof, does not include waves or signals per se and/or communication media.

According to various embodiments, the computer architecture 600 may operate in a networked environment using logical connections to remote computers through a network such as the network 620. The computer architecture 600 may connect to the network 620 through a network interface unit 616 connected to the bus 610. It should be appreciated that the network interface unit 616 also may be utilized to connect to other types of networks and remote computer systems. The computer architecture 600 also may include an input/output controller 618 for receiving and processing input from a number of other devices, including a keyboard, mouse, or electronic stylus. Similarly, the input/output controller 618 may provide an output to a display screen, a printer, or other type of output device.

It should be appreciated that the software components described herein may, when loaded into the CPU 602 and executed, transform the CPU 602 and the overall computer architecture 600 from a general-purpose computing system into a special-purpose computing system customized to facilitate the functionality presented herein. The CPU 602 may be constructed from any number of transistors or other discrete circuit elements, which may individually or collectively assume any number of states. More specifically, the CPU 602 may operate as a finite-state machine, in response to executable instructions contained within the software modules disclosed herein. These computer-executable instructions may transform the CPU 602 by specifying how the CPU 602 transitions between states, thereby transforming the transistors or other discrete hardware elements constituting the CPU 602.

Encoding the software modules presented herein also may transform the physical structure of the computer-readable media presented herein. The specific transformation of physical structure may depend on various factors, in different implementations of this description. Examples of such factors may include, but are not limited to, the technology used to implement the computer-readable media, whether the computer-readable media is characterized as primary or secondary storage, and the like. For example, if the computer-readable media is implemented as semiconductor-based memory, the software disclosed herein may be encoded on the computer-readable media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media, to change the optical characteristics of those locations. Other transformations of physical media are possible without departing from the scope and spirit of the present description, with the foregoing examples provided only to facilitate this description.

In light of the above, it should be appreciated that many types of physical transformations take place in the computer architecture 600 in order to store and execute the software components presented herein. It also should be appreciated that the computer architecture 600 may include other types of computing devices, including hand-held computers, embedded computer systems, personal digital assistants, and other types of computing devices known to those skilled in the art. It is also contemplated that the computer architecture 600 may not include all of the components shown in FIG. 6, may include other components that are not explicitly shown in FIG. 6, or may utilize an architecture completely different than that shown in FIG. 6.

Based on the foregoing, it should be appreciated that concepts and technologies for providing a handle bar route extension mechanism have been disclosed herein. Although the subject matter presented herein has been described in language specific to computer structural features, methodological and transformative acts, specific computing machinery, and computer readable media, it is to be understood that the invention defined in the appended claims is not necessarily limited to the specific features, acts, or media described herein. Rather, the specific features, acts and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the present disclosure, some embodiments of which are set forth in the following claims.

What is claimed is:

1. A computer-implemented method for building a flight route line, comprising:
   rendering a map on a display;
   rendering an initial location;
   rendering a handle bar route extension mechanism at the initial location on the display;
   receiving an input to adjust the handle bar route extension mechanism to create an additional location;
   rendering the additional location; and
   building the flight route line from the initial location to the additional location in response to the input to adjust the handle bar route extension mechanism.

2. The method of claim 1, further comprising:
   determining if an additional handle bar route extension mechanism is to be rendered; and
   rendering an additional handle bar route extension mechanism in response to determining that the additional handle bar route extension mechanism is to be rendered.

3. The method of claim 1, wherein rendering the handle bar route extension mechanism comprises rendering the handle bar route extension mechanism in a direction corresponding to a direction criteria.

4. The method of claim 3, wherein the direction criteria is in a direction similar to a current flight route line, in a direction towards a possible destination, in a direction based on a previously used flight route line from a prior flight, or in a direction based on a current flight condition.

5. The method of claim 1, wherein the handle bar route extension mechanism is rendered with a length based on a speed of an aircraft or a number of potential waypoints.

6. The method of claim 1, wherein the initial location comprises a departure point or an intermediate location between two locations.

7. The method of claim 1, wherein the initial location is rendered automatically based on an input that the flight route line should be adjusted.

8. The method of claim 1, further comprising rendering a second handle bar route extension mechanism at the initial location.

9. The method of claim 1, wherein the input comprises a touch input, a keyboard input or a mouse input.

10. A device for building a flight route line, the device comprising:
a map application configured to
render a map on a display;
render an initial location;
render a handle bar route extension mechanism on the display;
render an additional location; and
build a flight route line from the initial location to the additional location in response to a touch input to adjust the handle bar route extension mechanism; and
a touchscreen configured to
render the display,
render the handle bar route extension mechanism on the display, and
detect the touch input to adjust the handle bar route extension mechanism.

11. The device of claim 10, wherein the map application is further configured to:
determine if an additional handle bar route extension mechanism is to be rendered; and
render an additional handle bar route extension mechanism in response to determining that the additional handle bar route extension mechanism is to be rendered.

12. The device of claim 10, wherein rendering the handle bar route extension mechanism comprises rendering the handle bar route extension mechanism in a direction corresponding to a direction criteria.

13. The device of claim 12, wherein the direction criteria is in a direction similar to a current flight route line, in a direction towards a possible destination, in a direction based on a previously used flight route line from a prior flight, or in a direction based on a current flight condition.

14. The device of claim 10, wherein the handle bar route extension mechanism is rendered with a length based on a speed of an aircraft or a number of potential destination points.

15. The device of claim 10, wherein the initial location comprises a departure point or an intermediate location between two locations.

16. The device of claim 10, wherein the initial location is rendered automatically based on an input that the flight route line should be adjusted.

17. The device of claim 10, further comprising rendering a second handle bar route extension mechanism at the initial location.

18. The device of claim 10, wherein the touch input to adjust the handle bar route extension mechanism comprises
a touch input at a location on the device proximate to the rendering of the initial location; and
a drag input from the location on the device proximate to the rendering of the initial location to a second touch point at a desired location.

19. A computer, comprising:
a central processing unit; and
a computer-readable storage medium in communication with the central processing unit, the computer-readable storage medium comprising computer-executable instructions stored thereupon which, when executed by the central processing unit, cause the central processing unit to
render a map on a display;
render an initial location;
render a handle bar route extension mechanism at the initial location on the display;
receive an input to adjust the handle bar route extension mechanism;
render an additional location; and
build a flight route line from the initial location to the additional location in response to the input to adjust the handle bar route extension mechanism.

20. The computer of claim 19, wherein the handle bar route extension mechanism comprises a handle bar line and a preliminary point.

* * * * *